United States Patent [19]

Mackrle et al.

[11] 4,341,630
[45] Jul. 27, 1982

[54] ARRANGEMENT FOR SEPARATION OF A SUSPENSION OR EMULSION FROM LIQUIDS BY FLOTATION

[75] Inventors: Svatopluk Mackrle, Brno; Milos Novotny, Ostrava, both of Czechoslovakia

[73] Assignee: Agrotechnika, narodny podnik, Zvolen, Czechoslovakia

[21] Appl. No.: 273,445

[22] Filed: Jun. 15, 1981

[30] Foreign Application Priority Data

Jun. 16, 1980 [CS] Czechoslovakia ............... 4273-80

[51] Int. Cl.³ .................................................. C02F 1/24
[52] U.S. Cl. .................................. 210/221.2; 209/168; 209/170
[58] Field of Search ............... 210/608, 703, 704, 705, 210/706, 707, 708, 221.1, 221.2, 532.1, 538, 540; 209/168, 170

[56] References Cited

U.S. PATENT DOCUMENTS

| | | | |
|---|---|---|---|
| 1,285,061 | 11/1918 | Daman | 210/221.1 |
| 1,374,500 | 4/1921 | Greenawalt | 209/168 |
| 2,307,154 | 1/1943 | Osung | 210/703 |
| 2,874,842 | 2/1959 | Krofta | 210/221.2 |
| 3,250,394 | 5/1966 | Clark | 210/221.2 |
| 3,966,598 | 6/1976 | Ettelt | 210/703 |
| 3,977,970 | 8/1976 | Willis | 210/221.2 |
| 4,008,153 | 2/1977 | Mackrle | 210/221.1 |

FOREIGN PATENT DOCUMENTS

| | | | |
|---|---|---|---|
| 52-48268 | 4/1977 | Japan | 210/221.2 |
| 570558 | 9/1977 | U.S.S.R. | 210/221.2 |
| 655654 | 7/1979 | U.S.S.R. | 210/221.2 |

*Primary Examiner*—Ernest G. Therkorn

[57] ABSTRACT

Arrangement for separation of suspensions or emulsions from liquids by flotation having a flotation space widening from the bottom upwards, to be again narrowed from the place of its largest width upwards. The flotation space is formed by a partition wall within a tank, the supply of cleaned liquid terminating into the lower part of the flotation space. The flotated foam is removed at the surface of the top part of the flotation space, with transfer openings above the widest place of the flotation space terminating in a collecting space of cleaned liquid defined by the partition wall and the wall of the tank, a rectifying wall being provided in front of said transfer openings for preventing passage of the flotated suspension to the collecting space of cleaned liquid.

8 Claims, 2 Drawing Figures

ARRANGEMENT FOR SEPARATION OF A SUSPENSION OR EMULSION FROM LIQUIDS BY FLOTATION

BACKGROUND OF THE INVENTION

This invention relates to an arrangement for the separation of a suspension or emulsion from liquids by flotation. The arrangement comprises a flotation vessel with a mantle, or a side wall, means for supplying a liquid to be treated to the vessel, means for the removal of the treated liquid, and means for the removal of the foam which has been separated therefrom.

The flotation process for separating a suspension from liquids is frequently more efficient than processes based upon the gravitational separation of the suspension by sedimentation, and possibly also more efficient than processes using fluid filtration. Particularly in cases in which the separated suspension has a tendency for spontaneous flotation, flotation methods are also advantageous economically. For instance, that is the case in which waste waters containing fats in the meat industry have to be cleaned, and when waste waters containing oil from the food industry, and waste waters from petrochemical plants and the like have to be cleaned.

A wider application of separation of suspensions from liquids is permitted by the technology of the addition of flotation agents to the liquid to be cleaned. However, the separation of similar waste waters by flotation, frequently from large quantities of water, presents some difficulties in arrangements which are actually now being used.

The types of arrangements now being actually mostly used for the flotation of large quantities of liquids have the shape of rectangular vessels which are mostly made of concrete. The supply and distribution of air in the flotation apparatus uses a pressure saturation of a part of the treated liquid by air (at a pressure of 0.3 to 0.5 MPa) which is accomplished outside the flotation vessel. The liquid saturated with air is thereafter, after pressure reduction, mixed with the main stream of treated liquid, and the mixture of both parts of the liquid is introduced into a flotation vessel where the surplus of air is separated in the form of small air bubbles sticking to the surface of the suspension in the liquid. The suspension particles with separated air particles are thereafter taken along to the surface of the flotation vessel where they are mechanically removed by rakes or by sucking-off devices. A part of the suspension which drops to the bottom of the flotation vessel also has to be removed. The method of removal by rakes is also here frequently used.

Flotation apparatus in the shape of vertical cylindrical vessels have also been recently used. The supply of the treated liquid and the supply of a part of the treated liquid saturated under pressure with air is here, after pressure reduction, introduced into a central distributing space in the lower part of the flotation reactor. The removal of the flotated suspension on the surface, and the removal of a part of the suspension sedimented on the bottom of the flotation apparatus is accomplished in a manner similar to that employed with rectangular flotation apparatus, that is, by rakes or sucking-off means. The raking and sucking-off means is, in such case, fixed on a rotating arm turning about a central axis.

In large vessels, these mechanical means for removal of the flotated and sedimented suspension are relatively complicated, and also complicate the construction of the vessel proper of the flotation apparatus. Particularly with flotation arrangements in which, in order to obtain the required efficiency of separation of colloidal suspensions, an adjustment of the pH value by acids up to a value is used, and the mantle or wall of the flotation apparatus has to be resistant to acids, the provision of the arrangement with the above-mentioned means for removal of sludge substantially increases the total cost of the arrangement.

SUMMARY OF THE INVENTION

It is among the objects of the present invention to eliminate or at least substantially to reduce the disadvantages of the prior art mentioned above.

In accordance with the invention, a partition wall defining a flotation space, into which the liquid to be treated is fed, is widened upwardly in its lower part, and at the location of its maximum width it passes over into its upper part which narrows in an upward direction to a top part, where an inlet for the means for removal of the flotated foam is provided. Such removal means continues to an inclined direction downwardly beyond the flotation vessel. Transfer openings are provided in the partition wall above its passage into the upper part of the flotation space near the wall of the vessel, such openings connecting the flotation space with a space for the collection of cleaned liquid, such collecting space being formed between the partition wall of the upper part of the flotation space and the opposite part of the wall, there being a rectifying wall provided in front of such transverse openings, the rectifying preventing passage of the flotated suspension into the collecting space for the cleaned liquid.

The liquid to be treated can be fed to a retention space formed by a vessel in the lower part of the flotation space. The retention space may be arranged coaxially of the flotation space in the lower part thereof, and its side wall can have the shape of a vessel open at the bottom with a widened lower edge, the conduit for supplying the mixture to be treated terminating in the upper part of the vessel forming the retention space. The flotation space passes over to means for the removal of sediment and sludge in its lower part, and driven rakes can be provided in the top part of the flotation space.

It is advantageous from the manufacturing and functional point of view if the side wall of the flotation vessel, the partition wall of the flotation space, the inlet of the means for the removal of the flotation foam, the means for the removal of the sedimented sludge, and possibly also the side wall of the vessel forming the retention space are arranged coaxially.

For the separation of unstabilized fat emulsions, an arrangement is advantageous wherein the supply of the liquid to be treated terminates in the lower part of the flotation space, with aeration elements connected to an air supply provided above the discharge of such liquid supply.

DESCRIPTION OF THE DRAWINGS

Exemplary embodiments of the arrangement according to this invention are diagrammatically shown in the attached drawings, wherein.

DESCRIPTION OF PREFERRED EMBODIMENTS

Figure 1:
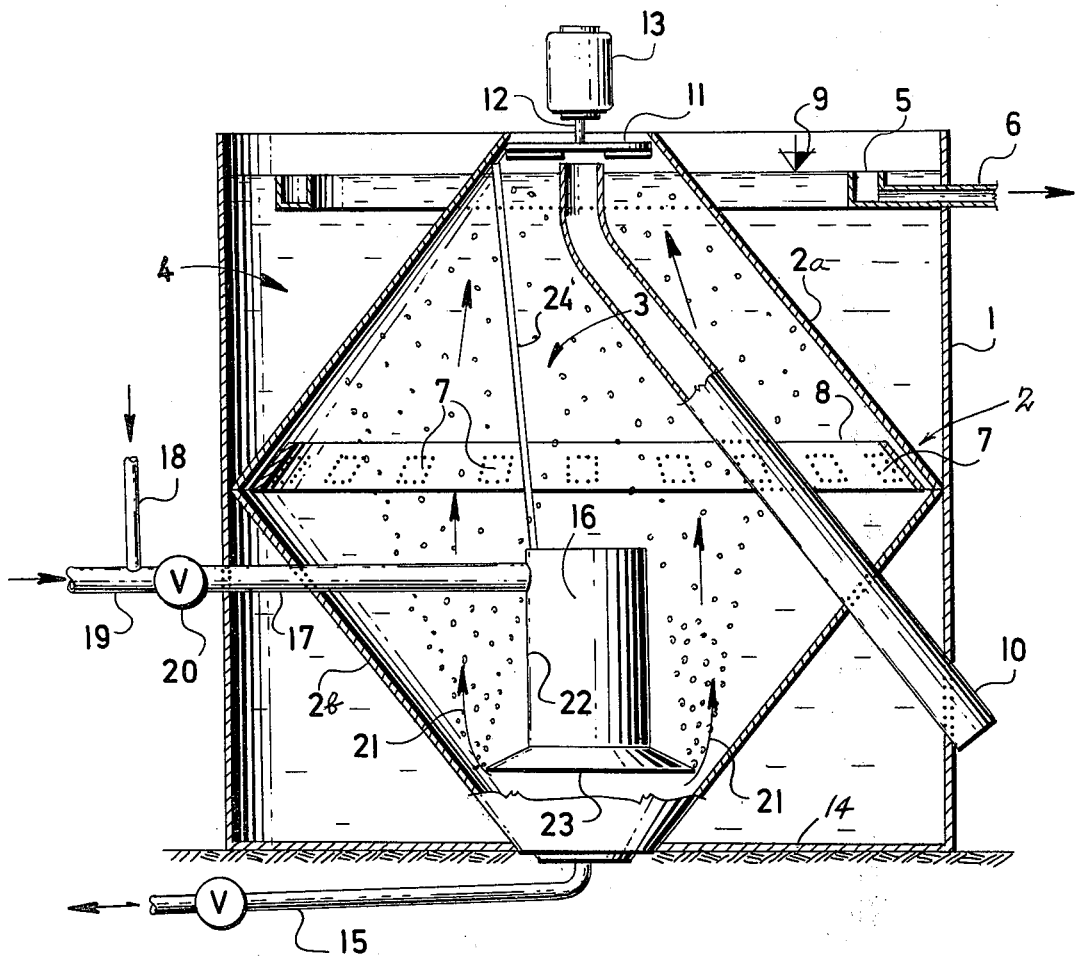
FIG. 1 is a view in vertical axial section of a first arrangement in accordance with the invention.

Turning now to FIG. 1, in a vessel comprising a vertical cylindrical mantle or side wall 1 and a horizontal bottom 14, a partition wall 2a, 2b defines a flotation space 3 therewithin. The lower part 2b of the partition wall 2 widens upwardly, and at the place of the maximum width where it reaches the side wall 1 it passes over into the upper part 2a which narrows upwardly to a top part. The upper part 2a of the partition wall 2 forms, together with the side wall 1, a space 4 for the collection of cleaned liquid, space 4 being provided with a collecting trough 5 and with a conduit means 6 for the removal of cleaned liquid.

The flotation space 3 communicates with the space 4 for collecting clean liquid by transfer openings 7 in the partition wall 2a near the mantle or outer wall 1 of the tank. It will be seen that the junction between partition walls 2a and 2b abuts and is connected to the wall 1, and so the space 4 is separated from the lower space defined between the wall 1 and the partition wall 2b, such lower thus-defined space being empty. A rectifying or directing wall 8 in the form of a frusto-conical band screens openings 7 from rising streams of floating particles, thus preventing passage of the flotated suspension to the collecting space 4 for cleaned liquid. As shown, the rectifying wall 8 is secured to the lower part of partition wall 2a so as to be spaced a short distance radially inwardly therefrom.

The inverted funnel-shaped partition wall 2a extends at its top part beyond the liquid surface 9. Removal means 10 of flotated foam passes downwardly in an inclined directed through foam removal conduit means 10 and leaves the flotation apparatus in the lower part of the wall 1, conduit 10 having its upper inlet opening disposed centrally at the surface of the flotation space 3, thus securing a gravitational removal of floated foam. Rakes 11 fixed on a shaft 12 of a drive 13 such as a motor can be used at the surface of the flotation space 3.

Means 15 for the removal of sedimented sludge is connected to the lowermost part of the partition wall 2b, that is, to the lowermost part of the flotation space 3. A vessel 16 with a side wall 22 having the shape of an inverted tumbler with a widened lower edge is provided in the lower part of the flotation space 3 within the partition wall 2b. Vessel 16 serves to define a retention space for liquid to be treated, which is fed into the arrangement. A supply conduit 17 for a mixture of liquid to be treated and of a part of the treated liquid saturated by air is introduced into the upper part of the side wall 22 of the vessel 16. A suitable pressure pump with an air ejector on the outlet of such pump serves for the saturation of liquid with air. This known arrangement is not shown in the drawing.

The liquid with air at a pressure of 0.3 to 0.5 MPa is added through a supply conduit 18 to the main stream of liquid pumped by the pressure pump through the pressure supply conduit 19 to the flotation apparatus. A pressure reduction valve 20 is provided in the supply conduit 19 downstream of the outlet of the supply conduit 18 for a part of the liquid saturated with air under pressure.

The mixture of liquid and of particles of separated air passes through a passage 21 between the lower edge 23 of the mantle or side wall 22 of the retention means 16 to the flotation space 3. The retention means 16 is connected through a deaerating conduit 24 with the medium above the free surface 9, as shown. The side wall 1 of the tank, the partition walls 2a, 2b, the wall 22 of means 16, the inlet of the foam removal conduit means 10 and the inlet of the sludge removal conduit means 15 are advantageously disposed coaxially, as shown in FIG. 1.

Figure 2:
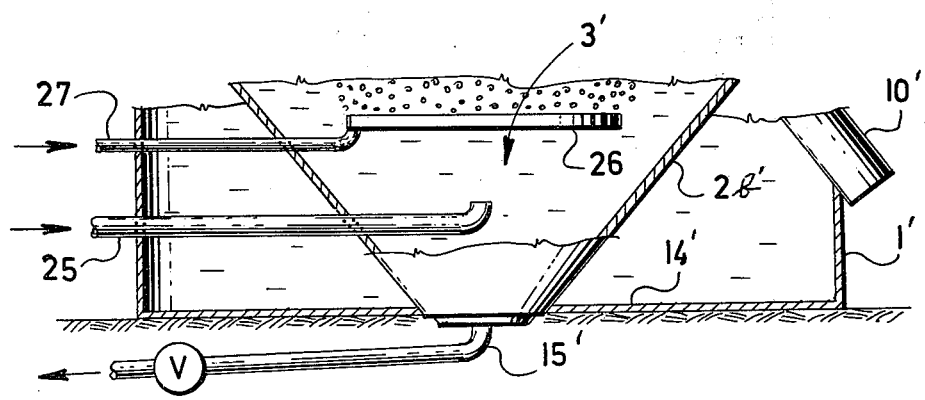
FIG. 2 is a fragmentary view, showing the lower part of a second arrangement in vertical section, such second arrangement being suitable for the separation of fat emulsions.

In the second embodiment of the arrangement, shown in FIG. 2, the retaining means 16 with the supply conduit 17 for the mixture of FIG. 1 are eliminated, and a supply conduit 25 for liquid to be treated terminates centrally therein, above which in the lower part of the flotation space 3' there are provided aeration elements 26 connected to an air supply 27. Other parts in the embodiment of FIG. 2 which are similar to those in FIG. 1 are designated by the same reference characters with an added prime.

The described exemplary arrangement of FIG. 1 operates as follows: Liquid to be treated is pumped to the flotation arrangement at a pressure of 0.3 to 0.5 MPa. A part of the treated liquid—about 20% of the overall amount—saturated with air under pressure is supplied to the pressure supply conduit 19. The reduction valve 20 reduces the pressure in the supply conduit 17 to a pressure corresponding to the height of the liquid column in the flotation arrangement.

Excess air is separated in the retention means 16, where the supply conduit 17 terminates, the excess air being in the shape of air particles which are primarily separated on the surface of suspension particles in the liquid and are the cause of flotation in the flotation space 3. Chemical reagents can be added to the liquid in order to increase the magnitude of suspension particles by coagulation, or flotation reagents can be added in order to increase the flotation effect.

The separation of air particles after pressure reduction requires a certain time, on the order of tens of seconds; the retention of the liquid in the retention means 16 serves this purpose. The liquid with separated air particles mostly sticking to solid particles present in the liquid enters the flotation space 3 by way of the passage 21. Particles of the suspension or emulsion are flotated by air particles to the surface. The funnel-shaped partition 2a in the upper part of the flotation space 3 advantageously rectifies the stream of flotated suspension to the center, so that the foam flotated from the whole cross section of the flotation vessel is concentrated into a small area on the surface in the top part of the narrowing flotation space 3. This substantially simplifies the removal of the flotated foam and, for instance, a simple raking means, for instance a rake 11 of a diameter corresponding to the narrowed surface of the flotation space at the surface is sufficient for raking the foam to the foam removal conduit means 10, the inlet of which is situated centrally above the surface of the flotation space 3. The removal means 10 continues thereafter from the flotation arrangement at an inclination securing its gravitational emptying.

The space 4 for cleaned liquid serves for the removal of the cleaned liquid. Such space 4 communicates with the flotation space 3 by way of the above-mentioned transfer openings 7 in the lower part of the partition 2a near the tank wall 1. In order to prevent the entrance of the flotated suspension to the collecting space 4 for cleaned liquid, a rectifying wall 8 is provided in front of the transfer openings 7 in the flotation space 3, wall 8 being connected and sealed at its bottom edge to the junction between parts 2a and 2b of the partition 2. The wall 8 thus rectifies the streaming in front of the inlet into the transfer openings 7 to a downward flow, where a separation of all particles lighter than the liquid is accomplished; thus the liquid which enters the collecting space 4 is cleaned liquid without the floating suspension. The cleaned liquid, relieved by flotation of the suspension or emulsion, is removed by the collecting trough 5 and drawn off through the removal conduit means 6.

The arrangement according to FIG. 2 is suitable for the decomposition of unstabilized fat emulsions. This arrangement operates as follows: Waste waters with unstabilized fat or oil emulsions are supplied via the supply 25 to the lower part of the flotation space 3', where air is also introduced, the air being fed through pipe 27 to aeration elements 26. The supplied air speeds up the coagulation and flotation of fat and oil particles, which are floated to the surface of the flotation space 3'. The remaining functions of the arrangement of FIG. 2 are the same as those of the arrangement according to FIG. 1.

The described arrangements have a number of advantages. As a main advantage, there can be considered both the removal of the flotated foam and of the sedimented sludge. The concentrically narrowing shape of the flotation space does not require complicated and expensive mechanisms for the collecting or sucking-off of the flotated foam from the whole cross section of the apparatus, and for the removal of sedimented sludge at the bottom of the apparatus. This effects substantial savings of costs, particularly in larger apparatus. The construction of the vessel is also simplified; it does not require the suspension of driving chains, of scrapers as with rectangular vessels, or the guiding and support of rotating arms of scraping or sucking-off means as with cylindrical vessels.

The simplified construction of the vessel is particularly important with floating apparatus wherein the flotation proceeds at a low pH value—up to pH 3— where the whole apparatus has to be of acid resistant material, and the use of current mechanisms for the removal of foam and sludge substantially increases the costs of the whole arrangement.

The arrangements in accordance with the invention also have improved operating parameters, particularly in a reduced content of liquid in the flotated foam due to its better thickening in the conically narrowing portion 2a of the partition, which narrows the cross section of the flotation space 3 at the top. The dewatering exceeds values obtainable by a sucking-off system wherein the foam is sucked off by underpressure from the whole surface, an expensive procedure. Another advantage, which cannot be neglected, is the reduced cost for the maintenance of the arrangement in accordance with the invention.

Although the invention is illustrated and described with reference to a plurality of preferred embodiments thereof, it is to be expressly understood that it is in no way limited to the disclosure of such preferred embodiments but is capable of numerous modification within the scope of the appended claims. We claim:

1. Arrangement for the separation of suspensions or emulsions from liquids by flotation, comprising a vessel with a side wall, a partition wall within said side wall defining a flotation space with an upper and a lower part, means for supplying liquid to be treated to the arrangement, means for the removal of treated liquid, means for the removal of flotated foam and of sedimented sludge, the lower part of the flotation space widening from the bottom upwards to a top part, the supply of the treated liquid terminating in the flotation space, means for the removal of foam provided with an inlet at the top part of the flotation space and continuing downwards at an inclination beyond the flotation vessel, a collecting space for cleaned liquid formed between the wall of the vessel and the upper part of the partition wall in the upper part of the tank and separated by the upper part of the partition wall from the flotation space, transfer openings provided in the partition wall above the maximum width thereof, said transfer openings connecting the flotation space with the space for cleaned liquid, a rectifying wall provided in front of said transfer openings for preventing passage of the flotated suspension into the collecting space of cleaned liquid, and means including a collecting trough for the removal of cleaned liquid in the top part of the collecting space for cleaned liquid.

2. Arrangement as in claim 1, comprising means providing a retention space for the treated liquid within the lower part of the flotation space, the supply of treated liquid terminating in this retention space.

3. Arrangement as in claim 2, the means providing a retention space being arranged coaxially in the lower part of the flotation space, the wall of the means providing the retention space having the shape of a vessel open at the bottom, the supply of treated liquid terminating in the upper part of this vessel.

4. Arrangement as in claim 3, wherein the vessel open at the bottom has a side wall with a widened lower edge.

5. Arrangement as in claim 1, the lowest part of the flotation space passing over into means for the removal of sedimented sludge.

6. Arrangement as in claim 1, comprising a driven scraper provided in the top part of the flotation space.

7. Arrangement as in claim 1, wherein the wall of the flotation vessel, the partition wall forming the flotation space, the inlet of means for the removal of flotated foam, and the means for the removal of sedimented sludge are arranged coaxially.

8. Arrangement as in claim 1, wherein the supply of the treated liquid terminates in the lower part of the flotation space, and comprising aeration elements connected to an air supply provided above said supply of the treated liquid.

* * * * *